United States Patent
Fokle Kokou et al.

(10) Patent No.: US 12,321,472 B2
(45) Date of Patent: Jun. 3, 2025

(54) METHOD FOR BUILDING A PREDEFINED SECRET VALUE

(71) Applicant: THALES DIS FRANCE SAS, Meudon (FR)

(72) Inventors: Milas Fokle Kokou, Gemenos (FR); Guillaume Huysmans, Gemenos (FR)

(73) Assignee: THALES DIS FRANCE SAS, Meudon (FR)

( * ) Notice: Subject to any disclaimer, the term of this patent is extended or adjusted under 35 U.S.C. 154(b) by 1069 days.

(21) Appl. No.: 17/279,651

(22) PCT Filed: Aug. 22, 2019

(86) PCT No.: PCT/EP2019/072520
§ 371 (c)(1),
(2) Date: Mar. 25, 2021

(87) PCT Pub. No.: WO2020/064234
PCT Pub. Date: Apr. 2, 2020

(65) Prior Publication Data
US 2021/0390195 A1 Dec. 16, 2021

(30) Foreign Application Priority Data
Sep. 27, 2018 (EP) .................................. 18306271

(51) Int. Cl.
*G06F 21/00* (2013.01)
*G06F 21/62* (2013.01)
*G06F 21/78* (2013.01)

(52) U.S. Cl.
CPC .......... *G06F 21/6209* (2013.01); *G06F 21/78* (2013.01)

(58) Field of Classification Search
CPC .... G06F 21/6209; G06F 21/78; G06F 21/602; G06F 12/1408; G06F 2211/008
See application file for complete search history.

(56) References Cited

U.S. PATENT DOCUMENTS 10,326,744 B1 * 6/2019 Nossik ................ H04L 63/0435
2003/0194085 A1   10/2003 Dillaway
(Continued)

FOREIGN PATENT DOCUMENTS

WO    0235329    5/2002

OTHER PUBLICATIONS

International Search Report (PCT/ISA/210) and Written Opinion (PCT/ISA/237) mailed on Sep. 27, 2019, by the European Patent Office as the International Searching Authority for International Application No. PCT/EP2019/072520.

*Primary Examiner* — Tri M Tran

(57) ABSTRACT

A method for building a predefined secret value allocated to a first pod belonging to a node of a system having a second pod. The system includes a first storage area whose access is restricted to the node and a second storage area whose access is restricted to the second pod. The second pod retrieves a first value stored in a third storage area and a second value stored in the second storage area, and computes a third value by applying a first function to the first and second values. The second pod retrieves a fourth value stored in the first storage area and computes a fifth value by applying a second function to the third and fourth values. The first pod retrieves a sixth value stored in the first pod and computes the predefined secret value by applying a third function to the fifth and sixth values.

12 Claims, 3 Drawing Sheets

(56) References Cited

U.S. PATENT DOCUMENTS

| | | | |
|---|---|---|---|
| 2012/0297206 A1* | 11/2012 | Nord | H04L 9/14 |
| | | | 713/193 |
| 2013/0268776 A1* | 10/2013 | Motoyama | H04L 9/003 |
| | | | 713/189 |
| 2015/0127946 A1* | 5/2015 | Miller | H04L 9/0897 |
| | | | 713/171 |
| 2016/0283937 A1* | 9/2016 | Reese | G06Q 20/4012 |
| 2018/0034791 A1* | 2/2018 | Erez | G06F 21/53 |
| 2019/0146816 A1* | 5/2019 | Reno | G06F 21/10 |
| | | | 718/1 |
| 2019/0372757 A1* | 12/2019 | Rohatgi | H04L 9/003 |

* cited by examiner

METHOD FOR BUILDING A PREDEFINED SECRET VALUE

FIELD OF THE INVENTION

The present invention relates to methods for building a predefined secret value by an automated system. It relates particularly to methods of securely recalculating secret data whose value has been previously chosen in a system having an orchestrator.

BACKGROUND OF THE INVENTION

Systems intended to manage a large number of containers or virtual machines (VM) have an orchestrator which is in charge of automating and managing the containers (or VM) and their interactions.

Several systems providing a container orchestrator are currently known such as Kubernetes and Docker.

Generally, a container orchestrator is able to find a suitable machine on which to run a container (i.e. scheduling), to create and remove container instances to match demand (i.e. scaling), to detect container failures and automatically reschedule them (Health monitoring) and other features like the communication management between containers.

Usually, when a container or a micro service installed in a container needs to use a secret data, it retrieves the value of the secret data which is permanently stored in a storage area located in the system. The stored value could be stolen by a malevolent entity which manages to read the stored value. There is a need to mitigate such security risk.

SUMMARY OF THE INVENTION

The invention aims at solving the above mentioned technical problem.

An object of the present invention is a computer-implemented method for building a predefined secret value which has been allocated to a first pod belonging to a node of a system comprising an orchestrator. The node comprises a second pod. The system includes and controls a first storage area whose access is restricted to pods belonging to the node. The system includes a second storage area whose access is restricted to said second pod. The method comprises the successive steps:
(a) The second pod retrieves both a first secret value stored in a third storage area of the node and a second secret value stored in the second storage area and computes a third secret value by applying a first function to said first and second secret values.
(b) One of said first and second pods retrieves a fourth secret value stored in the first storage area and computes a fifth secret value by applying a second function to the third and fourth secret values.
(c) The first pod retrieves a sixth secret value stored in said first pod and computes the predefined secret value by applying a third function to the fifth and sixth secret values.

Advantageously, the system may be compliant with Kubernetes.

Advantageously, the second storage area may be handled by a relational database management system. Advantageously, the first pod may use the predefined secret value for a transaction with a server, the success of the transaction relying on the use of the predefined secret value.

Advantageously, the following steps may have been previously performed:

identifying the predefined secret value and allocating the predefined secret value to the first pod, getting the sixth secret value from a configuration file corresponding to the first pod, computing said fifth secret value from both the predefined secret value and the sixth secret value thanks to a function which is the inverse of said third function, identifying the fourth secret value and computing said third secret value from both the fourth secret value and the fifth secret value thanks to a function which is the inverse of said second function, identifying the first secret value and computing said second secret value from both the first secret value and the third secret value thanks to a function which is the inverse of said first function.

Advantageously, the method may comprise the step of storing both said predefined secret value and said sixth secret value in a storage unit associated to an Authentication Center.

An object of the present invention is an automated system including an orchestrator, a processor and a node comprising first and second pods. The system is configured to include and control a first storage area whose access is restricted to pods belonging to the node and to include a second storage area whose access is restricted to said second pod. The second pod includes instructions that, when executed by the processor, cause said second pod to retrieve both a first secret value stored in a third storage area of the node and a second secret value stored in the second storage area and to compute a third secret value by applying a first function to said first and second secret values. At least on of said first and second pods includes instructions that, when executed by the processor, retrieve a fourth secret value stored in the first storage area and compute a fifth secret value by applying a second function to said third and fourth secret values. Said first pod includes instructions that, when executed by the processor, cause said first pod to retrieve a sixth secret value stored in said first pod and to compute a predefined secret value by applying a third function to said fifth and sixth secret values.

Advantageously, the second storage area may be handled by a relational database management system or a non-relational database management system.

Advantageously, said first pod may be configured to use the predefined secret value for a transaction with a server, the success of the transaction relying on the use of the predefined secret value.

Advantageously, the system may comprise a trusted deployment center which is configured to choose the predefined secret value and to allocate the predefined secret value to the first pod, to get the sixth secret value from a configuration file corresponding to the first pod, to compute said fifth secret value from both the predefined secret value and the sixth secret value thanks to a function which is the inverse of said third function, to choose the fourth secret value and to compute said third secret value from both the fourth secret value and the fifth secret value thanks to a function which is the inverse of said second function, to identify the first secret value and to compute said second secret value from both the first secret value and the third secret value thanks to a function which is the inverse of said first function.

Advantageously, the trusted deployment center may be configured to store both said predefined secret value and said sixth secret value in a storage unit associated to an Authentication Center.

Advantageously, the secret value may be stored in a secure area protected by a software solution.

Advantageously, the third function may be based on a cryptographic function or mathematical function.

BRIEF DESCRIPTION OF THE DRAWINGS

Other characteristics and advantages of the present invention will emerge more clearly from a reading of the following description of a number of preferred embodiments of the invention with reference to the corresponding accompanying drawings in which.

DETAILED DESCRIPTION OF THE PREFERRED EMBODIMENTS

The invention may apply to any type of automated system comprising an orchestrator. It is well-suited for systems intended to manage a large number of components (like containers, services or micro-services) distributed on any number of computers or processors.

Figure 1:
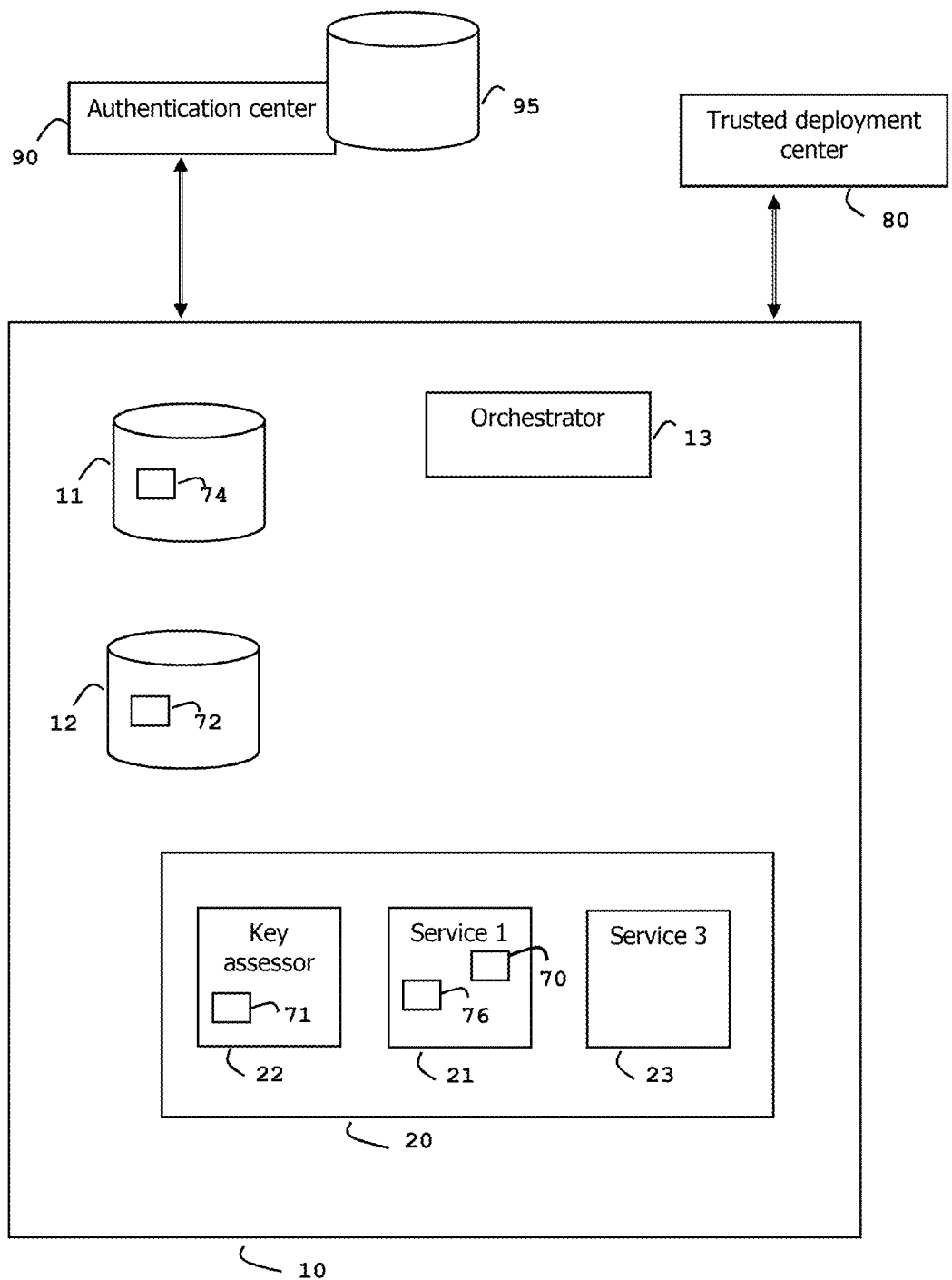
FIG. 1 is an example of architecture of an automated system according to the invention.

FIG. 1 shows an example of architecture of an automated system according to the invention.

In this example, the automated system 10 is deployed in cloud environment and is compliant with Kubernetes requirements.

The automated system 10 is intended to connect an authentication center 90 and a trusted deployment center 80.

The automated system 10 comprises an orchestrator 13, a first storage area 11, a second storage area 12 and at least one hardware processor. The automated system 10 comprises a node 20 which may be a virtual machine or physical machine. The node is designed to contain one or several pods.

In the example of FIG. 1, the node 20 includes three pods: 21, 22 and 23.

A pod may consist of one or more containers. In the embodiment of FIG. 1, each pod is implemented through a single container.

The first pod 21 (also named Service 1) contains a first micro service. The second pod 22 (also named Key assessor) contains a micro service specific to the invention. The third pod 23 (also named Service 3) contains a third micro service. For instance, the first micro service may be a payment application and the third micro service may be the UNIX ls (lists all files in a directory) function. Micro services may be in charge of any kind of service like load balancing, data enciphering, data deciphering or data storage in a database for example.

A predefined secret value 70 is assumed to have been allocated to the first pod 21. For example the predefined secret value 70 may be a key intended to be used to perform secure transactions.

The system 10 is designed to handle and manage access control of both said first storage area 11 and second storage area 12. The access of the first storage area 11 is restricted to pods belonging to the node 20. In other words, only the pods belonging to the node 20 are entitled to get a value securely stored in the first storage area 11.

The access of the second storage area 12 is restricted to the second pod 22 only. Thus only the second pod is entitled to get a value securely stored in the second storage area 12.

Both first and second storage areas can be implemented through separate entries in a single database. For instance, the single database may be the etcd as defined by Kubernetes.

In another embodiment, said first and second storage areas can be implemented through separate database. For instance, the first storage area 11 can be implemented via etcd while the second storage area 12 is implemented via a relational database management system.

In another embodiment, said first and second storage areas can be implemented through a file system or a database.

A first secret value 71 is stored in a third storage area belonging to the node 20. For instance, the third storage area may be a filesystem contained in the node 20 or a field included in the second pod 22. The first secret value 71 is allocated to the second pod 22.

A second secret value 72 is stored in the second storage area 12.

The second pod 22 includes software instructions that, when executed by a processor allocated to the node 20, cause said second pod to retrieve both the first secret value 71 from the third storage and the second secret value 72 from the second storage area 12. The second pod 22 is also designed to compute a third secret value 73 by applying a first function (named f2 at FIG. 4) to said first and second secret values. The function f2 can be based on a cryptographic function or mathematical function. In one embodiment, the function f2 is the XOR (eXclusive OR). In another embodiment, the function f2 may be based on an interpolation function. The function f2 may also be based on symmetric algorithms like AES or asymmetric algorithms like RSA.

A fourth secret value 74 is stored in the first storage area 11.

In one embodiment, the second pod 22 includes software instructions that, when executed by a processor allocated to the node 20, cause said second pod to retrieve the fourth secret value 74 from the first storage and to compute a fifth secret value 75 by applying a second function (named f1 at FIG. 4) to both the third secret value 73 and the fourth secret value 74.

Alternatively, the first pod 21 includes software instructions that, when executed by a processor allocated to the node 20, cause said first pod to retrieve the fourth secret value 74 from the first storage, to get the third secret value 73 from the second pod 22 and to compute a fifth secret value 75 by applying the second function (f1) to both the third secret value 73 and the fourth secret value 74.

A sixth secret value 76 is stored in the first pod 21. The sixth secret value 76 may be stored in a secure area protected by a software solution based for instance on white-box cryptography.

The first pod 21 includes instructions that, when executed by a processor allocated to the node 20, cause said first pod to retrieve the sixth secret value 76 and to compute the predefined secret value 70 by applying a third function (named f0 at FIG. 4) to the fifth secret value 75 and the sixth secret value 76.

The first, second and third functions may be similar or different.

Once the first pod 21 has reconstructed the predefined secret value 70, it can use the secret value to perform a transaction with an external entity like a server. The success of the transaction relies on the use of the predefined secret value 70. For instance, the first pod 21 can authenticate to an Authentication center 90 or establish a secure channel with the Authentication center 90 using the reconstructed secret value 70.

Advantageously, the second pod 22 can contribute to the rebuilding of preset secret data for a plurality of pods belonging to the same node.

In one embodiment, the automated system 10 can include the trusted deployment center 80.

Figure 2:
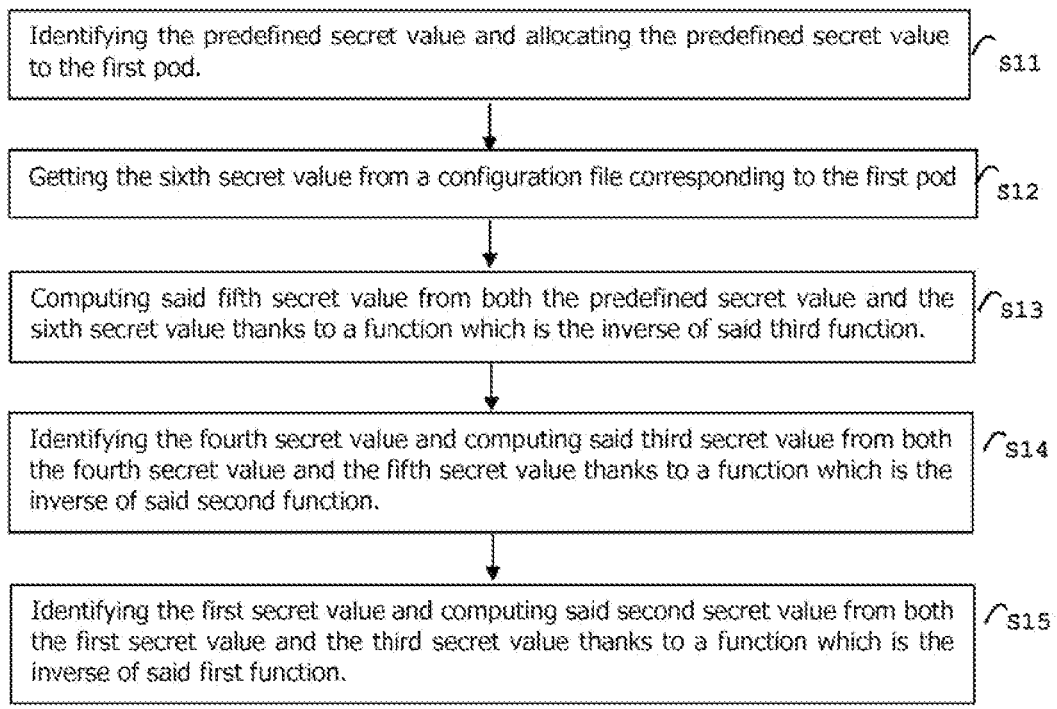
FIG. 2 depicts a flow chart for the enrolment of the set of secret data allowing to recalculate the predefined secret value according to an example of the invention.

FIG. 2 shows a flow chart for the enrolment of the set of secret data allowing to recalculate the predefined secret value 70 according to an example of the invention.

The set of secret data encompasses the first, second, fourth and sixth secret values presented of FIG. 1.

Generally, the steps of the enrolment phase are performed as soon as a new pod (e.g. a new instance of a service) is created (or is going to be created).

At step S11, the system 10 chooses the predefined secret value 70 and allocates it to the first pod 21. In one embodiment, the system 10 can get the predefined secret value 70 from a random key generator or from the Authentication center 90. In other words the system 10 identifies the predefined secret value 70 from an internal or external source and allocates it to the first micro service.

It is to be noted that different values of predefined secret can be allocated to different instances of the same micro service.

At step S12, the system may get the sixth secret value 76 from a configuration file corresponding to the first pod 21. For instance, the configuration file may be a YAML (Ain't Markup Language) file associated to the first pod 21. In particular, the sixth secret value 76 can be chosen by the provider of the first micro service.

At step S13, the system computes the fifth secret value 75 from both the predefined secret value 70 and the sixth secret value 76 thanks to a function $f0^{-1}$ which is the inverse of the third function f0. For example the third function f0 may be a polynomial interpolation and instantation in x=0 while the function $f0^{-1}$ is a polynomial generation and instantation in x≠0.

The secret values are computed by at the trusted deployment center 80 which includes a computer machine.

At step S14, the system chooses the fourth secret value 74 and computes the third secret value 73 from both the fourth secret value 74 and the fifth secret value 75 thanks to a function $f1^{-1}$ which is the inverse of the second function f1.

Advantageously, the system sets the fourth secret value 74 with a random value. Alternatively, the fourth secret value 74 may be set with a fixed or predefined value.

At step S15, the system identifies the first secret value 71 and computes the second secret value 72 from both the first secret value 71 and the third secret value 73 thanks to a function $f2^{-1}$ which is the inverse of said first function f2.

During a further step or after each computation steps, the system automatically stores the first secret value 71 in the third storage area of the node 20, the fourth secret value 74 in the first storage area 11 and the second secret value 72 in the second storage area 12.

Note that the sixth secret value 76 is assumed to be stored by the system during the creation of the instance of the first pod (i.e. first micro service).

The trusted deployment center 80 is in charge of storing each of said secret values in the relevant storage units of the system 10 and in the storage unit 95 associated to the Authentication Center 90.

The enrolment phase may comprise a step of storing the predefined secret value 70 in a storage unit 95 associated to an Authentication Center 90. Advantageously, the enrolment phase may also comprise a step of storing the sixth secret value 76 in the storage unit 95.

Figure 3:
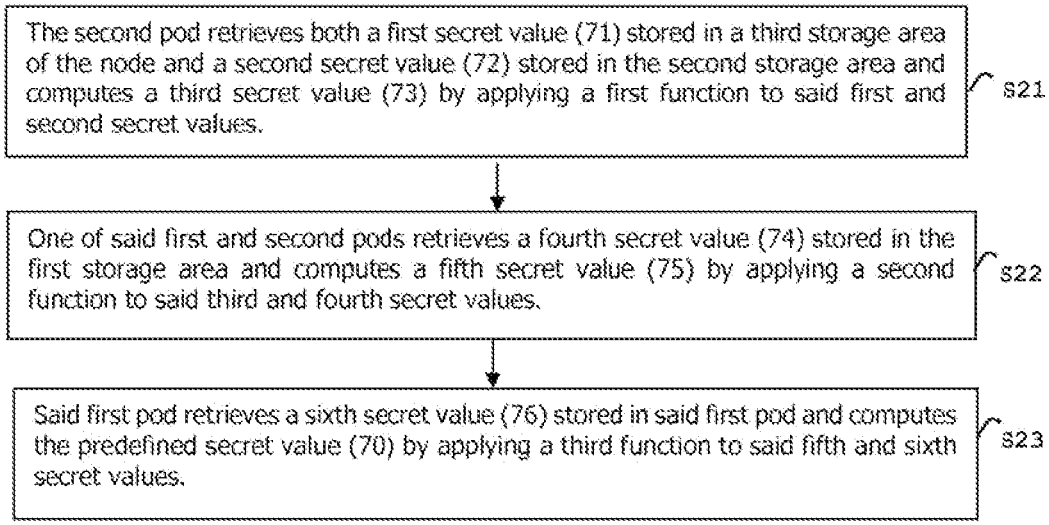
FIG. 3 depicts a flow chart for rebuilding of the predefined secret value from a set of secret data according to an example of the invention.

FIG. 3 shows a flow chart for the rebuilding of the predefined secret value 70 from the set of secret data according to an example of the invention.

At step S21, the second pod 22 retrieves both the first secret value 71 from the third storage area of the node 20 and the second secret value 72 from the second storage area 12. Then the second pod 22 computes the third secret value 73 by applying the first function f2 to the first and second secret values.

At step S22, either the first pod 21 or the second pod 22 retrieves the fourth secret value 74 from the first storage area 11 and computes the fifth secret value 75 by applying the second function f1 to the third and fourth secret values.

When needed, the second pod 22 provides the relevant intermediate result to the first pod 21.

At step S23, the first pod 21 retrieves the sixth secret value 76 and computes the predefined secret value 70 by applying the third function f0 to the fifth and sixth secret values.

An advantage of the invention is to ensure that the predefined secret value 70 becomes available only in the first pod 21 itself when it is required. The predefined secret value 70 is not permanently stored in the system 10.

Figure 4:
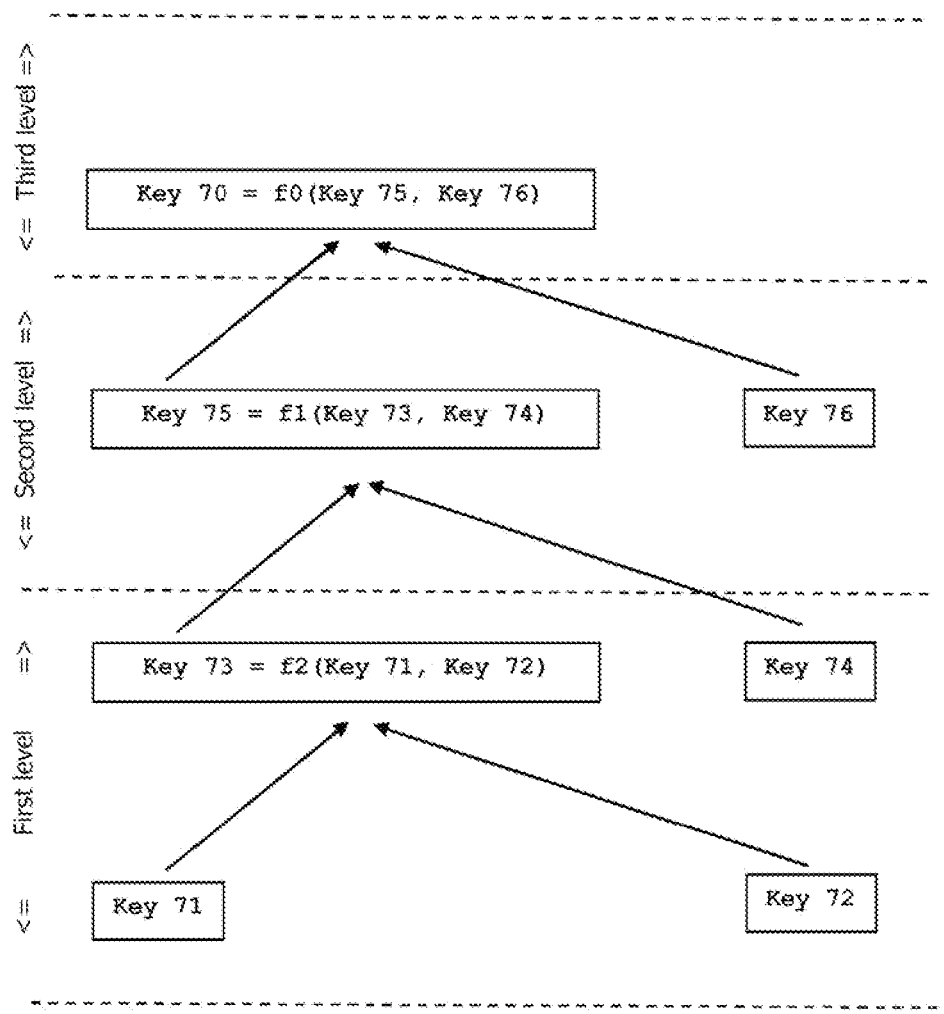
FIG. 4 depicts a diagram showing the three levels of computation steps for rebuilding the predefined secret value according to an example of the invention.

FIG. 4 depicts a diagram showing the three levels of computation steps for rebuilding the predefined secret value 70 according to an example of the invention.

At first level, the second pod 22 (Key assessor) computes the third secret value 73 as a first intermediate result. This computation can be successfully performed by the second pod 22 only.

At second level, the second pod 22 or the targeted pod (first pod) computes the fifth secret value 75 as a second intermediate result. This computation can be successfully performed by a trusted pod only (i.e. either the first pod 21 or the second pod 22).

At third level, the first pod 21 computes the predefined secret value 70. This computation can be successfully performed by the first second pod 21 only.

The invention, prevents an attacker located at the hypervisor level (e.g. which launches the VM) from gaining access to the protected secret value 70.

The invention, prevents an attacker having the privilege of VM administrator from gaining access to the protected secret value 70.

The invention, prevents an attacker located in another pod of the same node from gaining access to the protected secret value 70.

The architecture of the system shown at FIG. 1 is provided as example only. The architecture of the system may be different. For example, one of the first and second storage areas may be located outside the system and securely accessed by the system.

Although described in the framework of Kubernetes, the invention also applies to any type of system having an orchestrator of containers or virtual machines.

The invention claimed is:

1. A computer-implemented method for building a predefined secret value, wherein a system comprises an orchestrator and a node, wherein the node comprises a first pod and a second pod,
wherein said predefined secret value is allocated to said first pod,
wherein said system includes and controls a first storage area whose access is restricted to pods comprised in the node,
wherein said system includes a second storage area whose access is restricted to said second pod,
wherein the node comprises a third storage area that stores a first secret value allocated to the second pod,
wherein each of said first and second pods comprises one or more containers,
wherein the method comprises the successive steps:
the second pod retrieves both the first secret value from the third storage area and a second secret value stored in the second storage area and computes a third secret value by applying a first function to said first and second secret values,
one of said first and second pods retrieves a fourth secret value stored in the first storage area and computes a fifth secret value by applying a second function to said third and fourth secret values,
said first pod retrieves a sixth secret value stored in said first pod and computes the predefined secret value by applying a third function to said fifth and sixth secret values,
wherein the method comprise the following steps performed during an enrollment phase prior to said successive steps:
identifying the predefined secret value and allocating the predefined secret value to the first pod,
getting the sixth secret value from a configuration file corresponding to the first pod,
computing said fifth secret value from both the predefined secret value and the sixth secret value based on inverse of said third function,
identifying the fourth secret value and computing said third secret value from both the fourth secret value and the fifth secret value based on inverse of said second function,
identifying the first secret value and computing said second secret value from both the first secret value and the third secret value based on inverse of said first function.

2. The method according to claim 1, wherein said system is compliant with-Kubernetes requirements.

3. The method according to claim 1, wherein said second storage area is managed by a relational database management system.

4. The method according to claim 1, wherein said first pod uses the predefined secret value for a transaction with a server, the success of the transaction relying on the use of the predefined secret value.

5. The method according to claim 1, wherein the method comprises the step of storing both said predefined secret value and said sixth secret value in a storage unit associated to an Authentication Center.

6. A system including an orchestrator, a processor and a node, wherein said node comprises first and second pods,
wherein said system includes and controls a first storage area whose access is restricted to pods belonging to the node,
wherein said system includes a second storage area whose access is restricted to said second pod, wherein the node comprises a third storage area that stores a first secret value allocated to the second pod,
wherein each of said first and second pods comprising one or more containers,
wherein the second pod includes instructions that, when executed by the processor, cause said second pod to retrieve both said first secret value stored from the third storage area of the node and a second secret value stored in the second storage area and to compute a third secret value by applying a first function to said first and second secret values,
one of said first and second pods includes instructions that, when executed by the processor, retrieve a fourth secret value stored in the first storage area and compute a fifth secret value by applying a second function to said third and fourth secret values, and
said first pod includes instructions that, when executed by the processor, cause said first pod to retrieve a sixth secret value stored in said first pod and to compute a predefined secret value by applying a third function to said fifth and sixth secret values,
wherein the system further comprises the following instructions performed during an enrollment phase prior to the execution of the second pod's instructions:
identifying the predefined secret value and allocating the predefined secret value to the first pod,
getting the sixth secret value from a configuration file corresponding to the first pod,
computing said fifth secret value from both the predefined secret value and the sixth secret value based on inverse of said third function,
identifying the fourth secret value and computing said third secret value from both the fourth secret value and the fifth secret value based on inverse of said second function,
identifying the first secret value and computing said second secret value from both the first secret value and the third secret value based on inverse of said first function.

7. The system according to claim 6, wherein said system is compliant with Kubernetes requirements.

8. The system according to claim 6, wherein said second storage area is handled by a relational database management system or a non-relational database management system.

9. The system according to claim 6, wherein said first pod is configured to use the predefined secret value fo
r a transaction with a server, the success of the transaction relying on the use of the predefined secret value.

10. The system according to claim 6, wherein the trusted deployment center is configured to store both said predefined secret value and said sixth secret value in a storage unit associated to an Authentication Center.

11. The system according to claim 6, wherein said sixth secret value is stored in a secure area protected by a software solution.

12. The system according to claim 6, wherein said third function is based on a cryptographic function or mathematical function.

* * * * *